May 20, 1941. C. C. SCHEELE Re. 21,808

IRONING MACHINE

Original Filed Aug. 15, 1930 3 Sheets-Sheet 1

INVENTOR

Charles C. Scheele

WITNESS

H. L. Meade

BY

Lewis & Thompson

ATTORNEYS

May 20, 1941. C. C. SCHEELE Re. 21,808

IRONING MACHINE

Original Filed Aug. 15, 1930 3 Sheets-Sheet 2

WITNESS

H. L. Meade

INVENTOR

Charles C. Scheele

BY

Pennie & Thompson

ATTORNEYS

May 20, 1941. C. C. SCHEELE Re. 21,808

IRONING MACHINE

Original Filed Aug. 15. 1930 3 Sheets-Sheet 3

INVENTOR

Charles C. Scheele

BY

Pearson & Thompson

ATTORNEYS

WITNESS

H. L. Meade.

Reissued May 20, 1941

Re. 21,808

UNITED STATES PATENT OFFICE 21,808

IRONING MACHINE

Charles C. Scheele, Syracuse, N. Y., assignor to Easy Washing Machine Corporation, Syracuse, N. Y., a corporation of Delaware Original No. 1,887,734, dated November 15, 1932, Serial No. 475,408, August 15, 1930. Application for reissue filed June 14, 1933, Serial No. 675,733

4 Claims. (Cl. 38—61)

This invention relates to a new and improved ironing machine.

The main object of my invention is to provide an ironing machine and a support and cover therefor which is so constructed that when the ironing machine is not in use it may be lowered on its support and the cover placed in position so that the top of the cover will be at an elevation which will permit the apparatus to be conveniently used as a table.

Another object of the invention is the provision of a cover adapted in closed position to rest in a horizontal position enclosing the ironing machine, but adapted for and capable of bodily movement upward and rearward over the ironing machine and then downward to a vertical position largely, if not entirely, below the ironing machine operating parts at the rear of the ironing machine frame so as not to obstruct the use of said operating parts by the operator or to obstruct his view of the operation of said ironing machine parts and so as to be out of the way of the operator at both front and rear of said parts.

Another object is to provide an apparatus in which the raising and lowering of the ironing machine and the positioning of the cover may be accomplished by manipulation of only one part of the structure.

Another object of my invention is to provide an apparatus with the parts in such relation that the raising and lowering of the ironing machine may be accomplished with the expenditure of a minimum amount of exertion.

Other objects and advantages relate to the size, shape and arrangement of parts all as will more fully appear from the following description taken in connection with the accompanying drawings in which.

Figure 1:
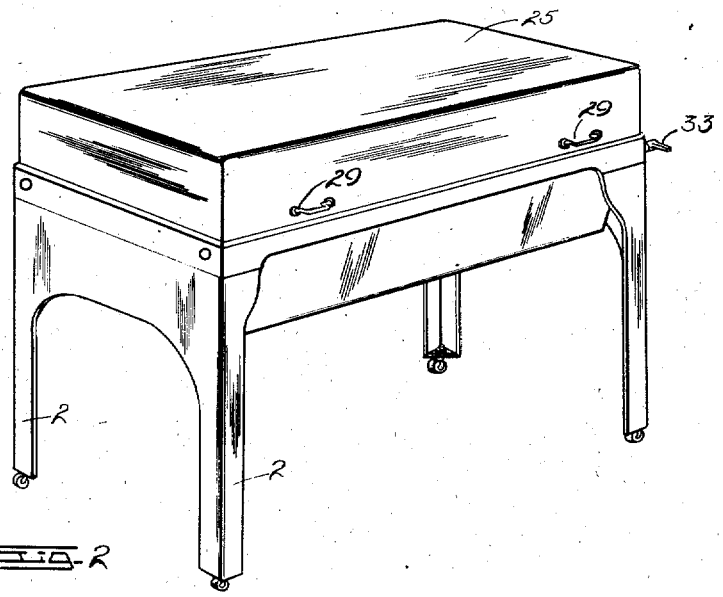
Figure 1 is a perspective view of the ironing machine with the cover in the closed position.

My device comprises a main frame 1 supported on legs 2. A platform 3 has one longitudinal edge pivotally mounted to the inner face of one side of the main frame 1 on pivots 4 and 5.

On platform 3 is secured an ironing machine 6 of any desired design, the one here shown including the usual gear casing 7, motor 8, ironing roll 9 and ironing shoe 10, the ironing shoe 10 being provided with a heating unit not shown and a lead 11 which may be connected to any convenient source of potential. The motor 8 is provided with a lead 12.

A switch 13 permits the motor to be started and stopped as desired. On the inner face of the side of frame 1 to which plateform 3 is pivoted, is pivotally mounted a stop member 14 as by lugs 15 which are rotatably mounted on a rod 16 which has its opposite ends journaled in frame 1.

Stop member 14 is spring-pressed as by springs 17 towards platform 3 and has its lower end return bent, as at —a—, to form a seat for the free edge of platform 3 to limit the downward movement of platform 3 about its pivots 4 and 5.

An actuating member 18 is pivotally mounted to one end of frame 1 as by a pivot pin 19. On one end of member 18 is rotatably mounted a flanged roller 20 which is adapted to contact with the under surface of brace 21 which extends across the under surface of platform 3.

Figure 2:
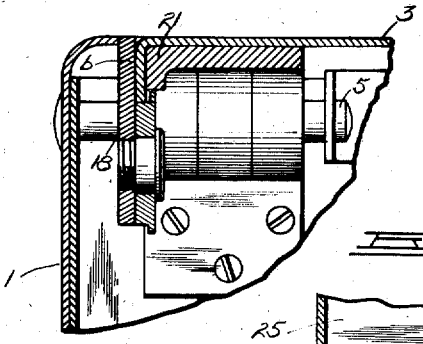
Figure 2 is a section on line 2—2 of Figure 5 with the parts in the positions indicated in dotted lines.
Figure 7:
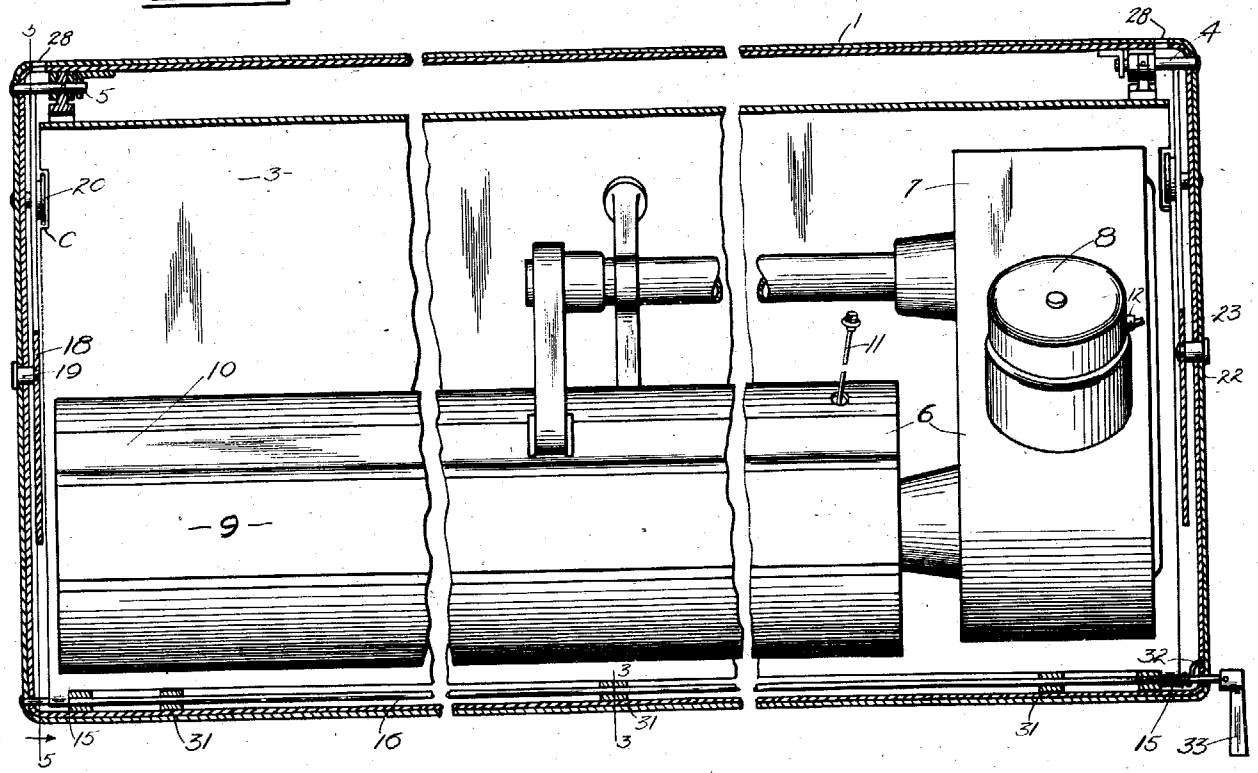
Figure 7 is a section on line 7—7 of Figure 5, with the parts in the position indicated in heavy lines.

The end of platform 3, as shown at —b— on Figure 2, extends downwardly below the under surface of brace 21 into the path of the flange on roller 20. For the purpose of providing clearance for the roller 20 when the platform 3 is in the lowered position, the brace 21 and platform 3 have portions cut away, as shown at —c— on Figure 7.

On the opposite end of frame 1 is pivotally mounted as by a pivot pin 22 an actuating member 23 similar to member 18. Member 23 carries a roller 24 adapted to contact with a brace not shown similar to brace 21, the adjacent end of platform 3 being formed in a way similar to the way in which the opposite end is formed.

A hooded cover 25 normally rests on the top of frame 1 and is of a size and shape to cover the ironing machine 6 when the same is in the lowered position.

The end of member 18 opposite to that on which the roller 20 is mounted is pivotally secured to the lower portion of one end of cover 25 adjacent one longitudinal side of cover 25 as by a pivot pin 26.

Member 23 is similarly secured to cover 25 at the opposite end thereof.

To stabilize the position of cover 25 on frame 1 when the same is in the closed position, I provide on one end adjacent the longitudinal side of cover 25 opposite to that adjacent which members 18 and 23 are pivoted, a depending semi-circular member 27 adapted to seat in a slot 28 in frame 1.

A similar semi-circular member, not shown, is secured to the opposite end of cover 25 and is adapted to seat in a slot, not shown, in frame 1.

*Operation*

Figure 5:
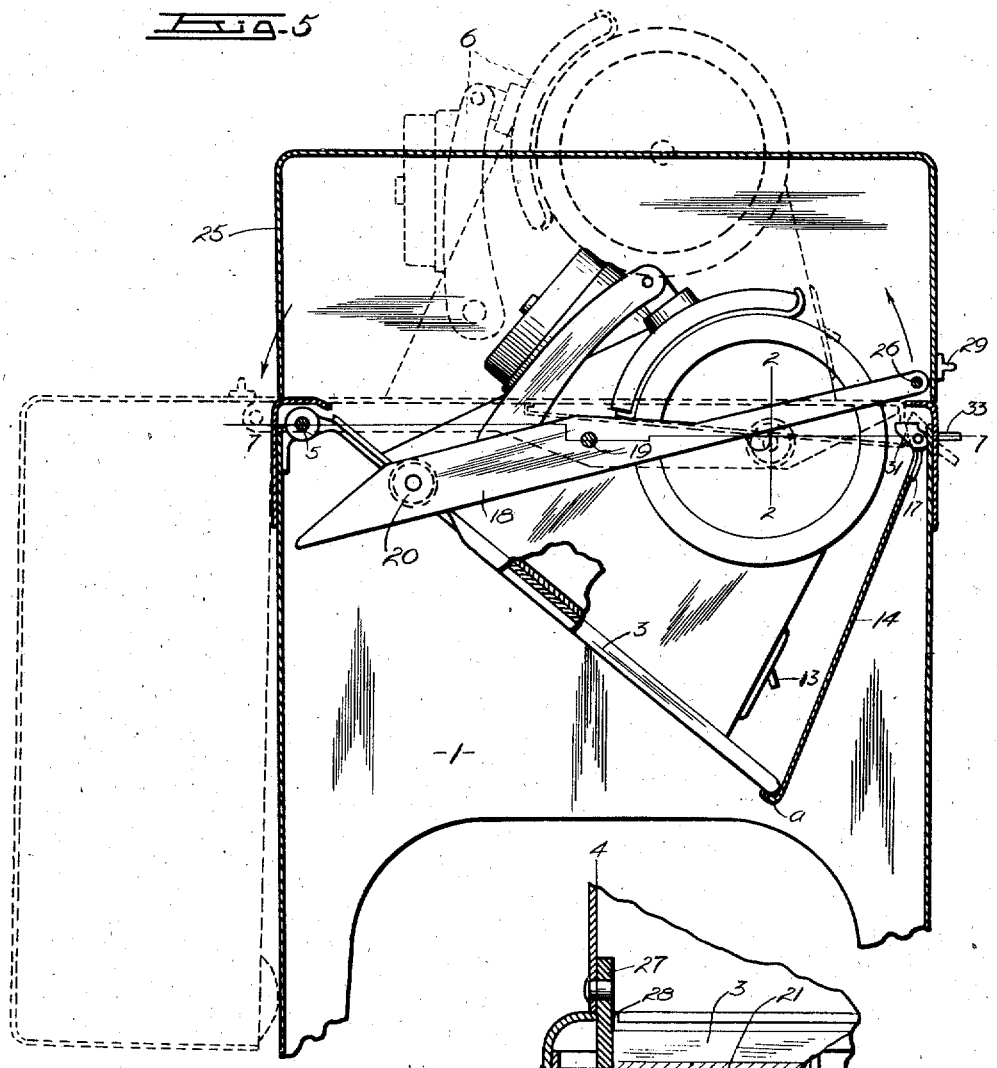
Figure 5 is a section on line 5—5 of Figure 7.
Figure 6:
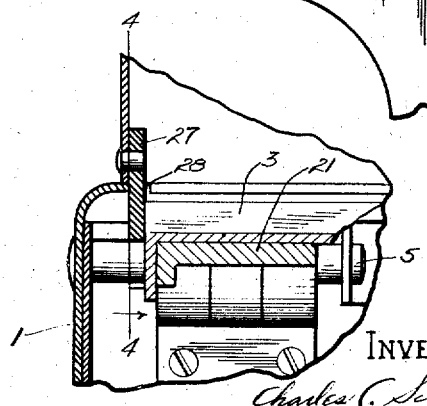
Figure 6 is a section on line 6—6 of Figure 4.

When the cover 25 is in position on frame 1, as shown in heavy lines on Figure 5, and it is desired to bring the ironer 6 to the operating position, the side of cover 25 to which members 18 and 23 are pivoted is raised by means of handles 29 and the cover is moved bodily across the upper face of frame 1 and thence downwardly into the position shown in dotted lines on Figure 5 with the lower rear edge resting against the legs of the ironing stand. This movement of cover 25 carrying with it members 18 and 23 will cause such members 18 and 23 to be moved about their pivots and this will cause rollers 20 and 24 to move through arcs from a position in cutaway portions —*c*— of the platform 3 into contact with the downwardly extending portions of platform 3 and then further movement will cause platform 3 to be carried upwardly about the pivots 4 and 5 into the position shown in dotted lines on Figure 5.

This movement of platform 3 carrying ironer 6 will bring the ironer 6 to the raised or operative position shown in dotted lines on Figure 5.

For the purpose of locking platform 3 in the raised position, I provide on rod 16 and secured thereto as by set screws 30 (see Figures 3 and 7), a plurality, in this case shown as three, of spaced locking members 31, approximately L-shaped in form, having one end adapted to contact with the under surface of the edge of platform 3 and having the other end adapted to contact with the frame 1 which will prevent the pivotal movement of members 31 and thus lock the platform 3 in the raised position.

The rod 16 is releasably held in a position to hold the members 31 in the locking position by means of a spring 32.

Figure 3:
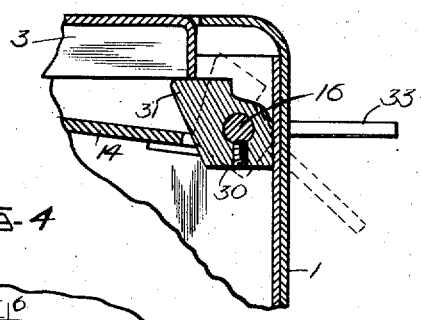
Figure 3 is a section on line 3—3 of Figure 7.
Figure 4:
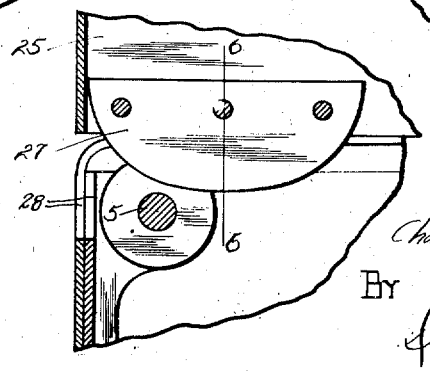
Figure 4 is a section on line 4—4 of Figure 6.

When it is desired to release platform 3 to permit its being lowered, rod 16 is rotated by means of a handle 33 which will cause the members 31 to be moved to the position shown in dotted lines on Figure 3 and out of the path of movement of platform 3.

When it is desired to move the ironer 6 to the down position, the movement of the cover 25 which has just been described is reversed, and the platform 3, carrying the ironer 6, will move downwardly by gravity, such downward movement being controlled by the rollers 20 and 24 passing along the under surface of platform 3.

When the edge of platform 3 is seated in the trough —*a*— on member 14, the downward movement of platform 3 will be arrested, at which time the cover 25 will have resumed its covering position on frame 1. It will be noted that with the cover in the position shown in dotted lines in Figure 5, that the front of the cover is in a position such that it may be used as a support for the ironed articles.

It will be understood that various types of ironing machines may be used in the combination here disclosed.

It will also be understood that the exact size and arrangement of parts may be varied without departing from the spirit of my invention for, although I have shown and described the specific structure and form and arrangement of parts as an embodiment of an exemplification of my invention, I do not desire to restrict myself to the exact size, shape or arrangement of parts as various changes may be made within the scope of the appended claims.

I claim:

1. A container for an ironing machine comprising a main frame, a lever pivotally mounted on each side of the frame, a platform intermediate the levers and having one end pivotally mounted on the frame, a roller on one end of each of the levers, said rollers being in contact with the under surface of the platform, a cover for the frame adapted to be moved from a closed position over the frame to an open position outside and at the rear of the frame, and pivotal connections between the forward side of the cover and the ends of the levers opposite those which carry the rollers whereby movement of the cover from the closed position to the open position will move the levers about their pivots to carry the rollers across the under surface of the platform to move the latter about its pivot.

2. A container for an ironing machine comprising a main frame, a lever pivotally mounted on each side of the frame, a platform intermediate the levers and having one end pivotally mounted on the frame, a roller on one end of each of the levers, said roller being in contact with the under surface of the platform, a cover for the frame adapted to be moved from a closed position over the frame to an open position outside and at the rear of the frame, pivotal connections between the forward side of the cover and the ends of the levers opposite those which carry the rollers whereby movement of the cover from the closed position to the open position will move the levers about their pivots to carry the rollers across the under surface of the platform to move the latter about its pivot, and means for guiding the rear side of the cover during its movement from the closed to the open position.

3. An ironing machine comprising cooperable ironing elements, a framework comprising a plurality of legs for supporting the ironing elements, a hollow box-like cover of substantial heighth resting on the framework with at least part of the ironing elements projecting upward into the confines of the cover, a pair of links pivoted to the cover and to the framework and enabling combined pivotal and bodily manual movement of the cover from a position enclosing the ironing elements through 90° to a position at the rear of the framework such that the lower rear portion of the cover rests against the legs of the framework and the front portion of the cover lies well below the top level of the ironing elements.

4. An ironing machine comprising a supporting structure, ironing means including a heated member carried thereby, a cover for said ironing means having an elongated top wall, end walls and front and back walls of substantial heighth as compared to the width of the top wall, said cover being displaceably attached to said supporting structure for upward and rearward movement with respect to said ironing means from a closed position in which the top wall of the cover overlies the ironing means to an open position in which the front wall of the cover occupies a substantially horizontal position wholly behind the heated member of said ironing means and below the top of the ironing means, and attachment means for said cover comprising a pair of links pivotally mounted on said supporting structure at opposite ends thereof and pivot connections between said links and said cover, whereby the pivoted members are constrained to move about an axis that is fixed with respect to said supporting structure, said links at the same time enabling bodily movement of the cover with respect to said supporting structure to which it is attached.

CHARLES C. SCHEELE.